United States Patent [19]

Granbom

[11] Patent Number: 4,920,817
[45] Date of Patent: May 1, 1990

[54] BALL SCREW WITH SCREW CAGE IN RACEWAY RING OF NUT

[76] Inventor: Bo Granbom, 5, Södergatan, S-736 00, Kungsör, Sweden

[21] Appl. No.: 224,353

[22] Filed: Jul. 26, 1988

[30] Foreign Application Priority Data

Jul. 28, 1987 [SE] Sweden .............................. 8702982

[51] Int. Cl.⁵ .............................................. F16H 25/22
[52] U.S. Cl. .................... 74/424.8 NA; 74/424.8 R; 74/459
[58] Field of Search ............... 74/424.8 R, 424.8 NA, 74/459, 89.15

[56] References Cited

U.S. PATENT DOCUMENTS 2,844,969  7/1958  Lohr ........................... 74/424.8 NA
4,542,661  9/1985  Teramachi ................. 74/424.8 NA

FOREIGN PATENT DOCUMENTS 450824   8/1948  Canada ..................... 74/424.8 NA
2231541  6/1972  Fed. Rep. of Germany.

Primary Examiner—Allan D. Herrmann
Attorney, Agent, or Firm—Cushman, Darby & Cushman

[57] ABSTRACT

A ball screw is provided in which the balls coacting with the screw and running in helical threads therein also run in parallel grooves of a raceway ring arranged coaxially about the screw. The grooves extend perpendicularly to the axis of the screw. The ring is freely rotatably mounted, but axially immobile in a nut element arranged coaxially around the raceway ring. A ball cage is arranged between the screw and the raceway ring and attached to the nut element.

5 Claims, 6 Drawing Sheets

BALL SCREW WITH SCREW CAGE IN RACEWAY RING OF NUT

BACKGROUND OF THE INVENTION

This invention relates to a new type of ball screw.

Ball screws are used when a great precision and a low friction are desired. The ball screw has further advantages such as a low starting resistance and a minimum lubrication need. However, the ball screw is beset with many shortcomings, the greatest one being a limited speed in most applications, i.e. revolution of the screw. There is also a risk of the nut getting stuck at an end stop. In the case when the ball screw is of the type provided with a ball cage, e.g. as shown in DE A1 2 231 541, there have been great difficulties in designing the ball cage so that all balls will bear against the flanks of the screw thread at the same time, it being ensured in this way that the ball screw operates optimally and that the greatest possible force can be transmitted.

SUMMARY OF THE INVENTION

It is possible through use of the present invention to achieve a ball screw provided with a ball cage that can operate at a substantially greater rate than what has been possible so far and the screw can be permitted to rotate at about 10,000 rpm. By the design of the nut of the invention the force by which the nut may get stuck in an end position can be substantially reduced in comparison with the known type of ball screw.

BRIEF DESCRIPTION OF THE DRAWINGS

The invention will be described in greater detail in the form of examples with reference to the drawing, wherein.

DETAILED DESCRIPTION

Figure 1:
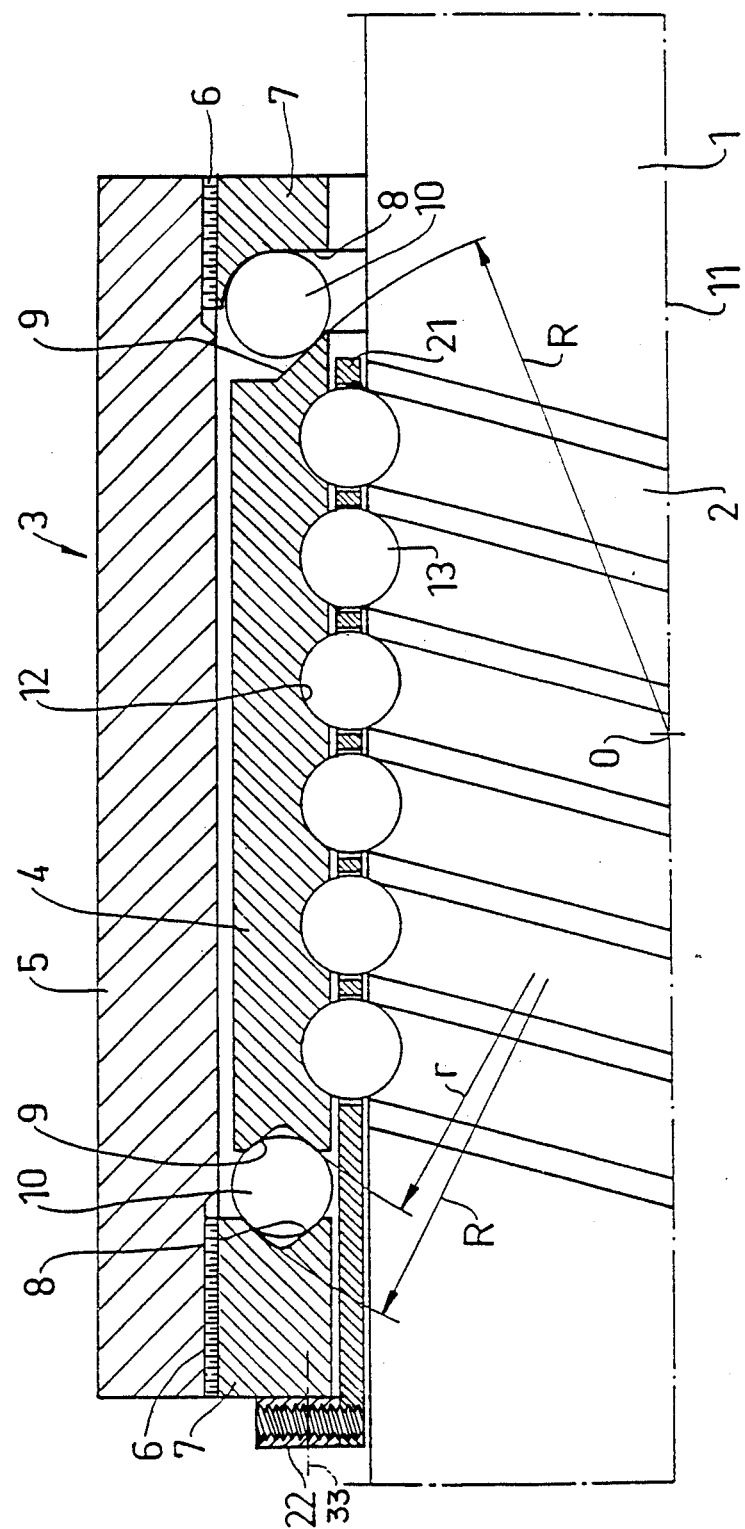
FIG. 1 shows schematically an embodiment of the ball screw of the invention.

The screw is designated by 1 and has, as is customary, one or more threads 2 which can be rolled or ground. It is to be understood that all of the threads are not drawn in the figures, but only one part of the ball screw is shown.

In FIGS. 1-4, the nut of the ball screw is generally designated by 3 and consists of a raceway ring 4 and a nut sleeve 5 arranged concentrically around the raceway ring. The illustrative example shown in FIG. 1 has a nut sleeve 5 which is provided with internal threads 6 at its end sections. End rings or bearing rings 7 are provided with corresponding threads on their pereipheral sides and are screwed into the end parts of the nut sleeve 3, as is apparent from the figure. The inwardly facing end surface of the respective bearing ring 7 has a ball race 8. The respective end surface of the raceway ring 4 is also provided with a ball race 9. Bearing balls 10 are arranged between the ball races 8 and 9 so that the raceway ring 4 is freely rotatably mounted in the nut sleeve 5 by means of the bearing balls 10.

The raceway ring 4 has parallel grooves 12 running on the inside of the raceway ring perpendicularly to the axis 11 of the screw 1. In the example shown, these grooves 12 have a profile substantially corresponding to that of the threads 2 of the screw 1 for receiving the balls 13 of the ball screw. Moreover, the ball screw has a ball cage 21. In order to achieve an exact and accurate axial motion of the nut in the operation of the device—the rotation of the screw 1—the ball cage 21 must be so designed that it prevents the balls 13 from rolling with the rotational motion of the screw, the ball cage being fixed to the nut 3, for example at its bearing ring 7 via a mounting ring 22, for instance by a fastener indicated by 33 (behind the cutting plane of the figure). This prevents the screw 1, balls 13, and ring 14 from rotationally translating together in the same direction about the axis 11. If this were allowed to happen, the screw 1 could not induce any axial movement into the ring 14 by the balls 13. By holding the balls 13 translationally fixed with respect to the nut 3, there is no possibility that the ring 14 can rotate in the same direction as the screw 1. Thus, any rotation of screw 1 provides accurate axial movement of the nut 3.

In The example shown in FIG. 1, left side, the outer half of the ball race 8 and the inner half of the ball race 9 have been given a profile generated by a sector of a circle with the centre 0 on the axis 11 of the screw 1, see more clearly the left part of FIG. 1, and with the radii R and r. Thanks to this profile of the ball races 8 and 9, the raceway ring 4 will have a certain freedom of upsetting movement and consequently a possibility of adapting itself exactly to the screw 2. On the right side of FIG. 1 is shown another way to obtain this freedom of movement. The ball race 8 has a conventional section form while the ball race 9 only has given the profile generated by a sector of a circle with the centre in O. It should be understood that either of these solutions can be used in the ball screw to reach the desired result.

Figure 2:
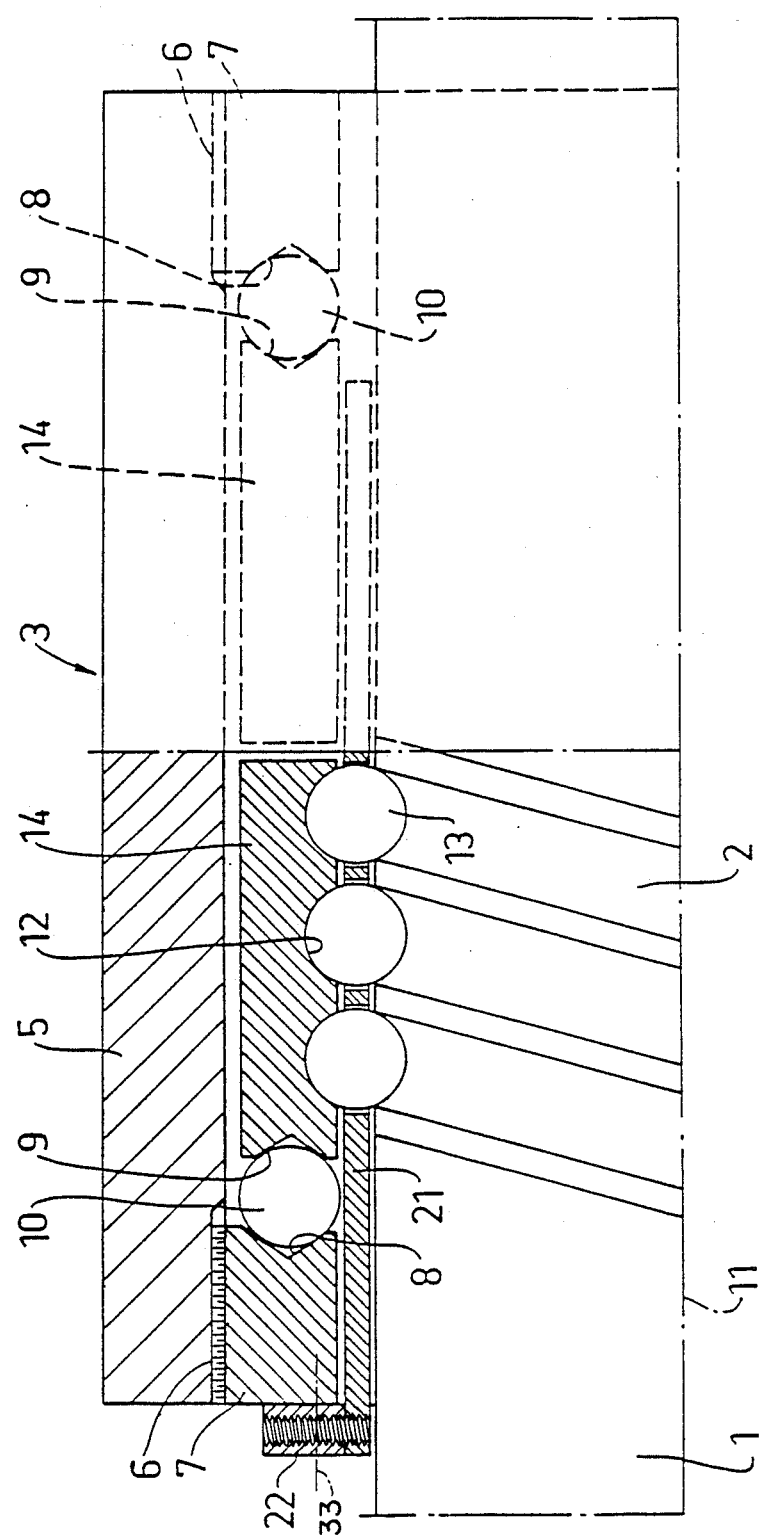
FIG. 2 shows a second embodiment of the invention.

In FIG. 2 a second embodiment of the invention is shown in which, in principle, the only difference is that the raceway ring has been divided into two parts 14 with a shown distance between the parts. This means that one or both the raceway rings 14 can be set towards the interior of the nut 3 by turning the respective bearing ring 7 cooperating with the nut sleeve 5 via the threads. This means that the balls 13 can be more or less strongly set against the flanks of the screw thrad 1 which will eliminate completely all play of the ball screw because the balls 13 are simultaneously held in position by the ball cage 21, preventing the balls 13 from moving in a peripheral direction. As the raceway ring is divided into two parts 14, each mounted in the nut sleeve only at one end surface, the possibility of upsetting movement of the parts 14 of the raceway ring will be automatically obtained.

In the example shown in FIG. 2 it is also possible to divide the ball cage 21 into two parts each attached to the nut 3, meaning that the raceway rings 14 at axial adjustment relative to each other will both cooperate in absorbing force and offer a better balance than in the case with one ball cage.

Figure 3:
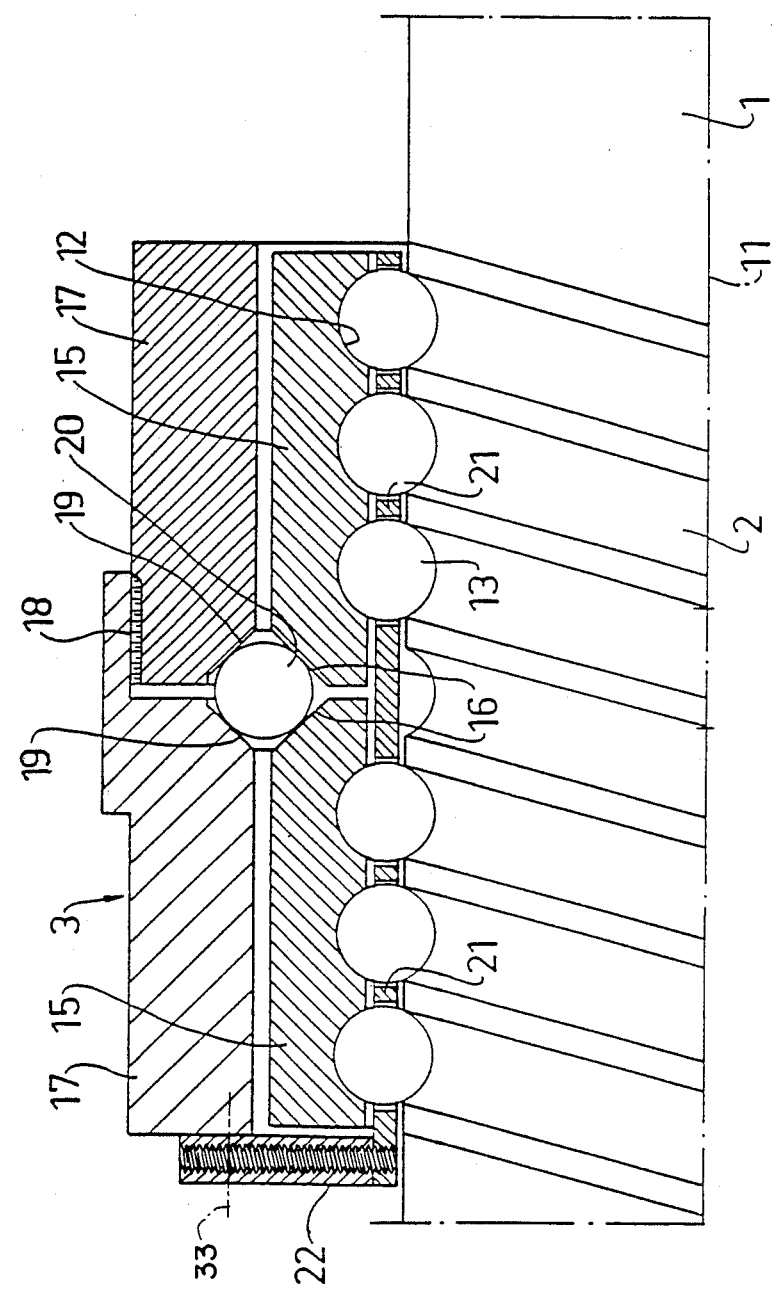
FIG. 3 shows a third embodiment of the invention.

FIG. 3 shows a third embodiment of the invention in which the raceway ring is divided into two parts 15 each having a ball race 16 in the end surfaces facing each other. The nut 3 is also divided into two parts 17 in a radial plane. The parts 17 of the nut can be threaded from the towards each other and locked in adjusted positions by suitable means not shown, for example locking screws, by means of a male-female member 18 provided with threads. The nut elements 17 have each a ball race 19 at the end surfaces facing each other. The parts 15 of the raceway ring are rotatably mounted by means of bearing balls 20 to the nut sleeve 17. Also in this embodiment, the ball cage 21 can be made in two parts, with each part attached to the nut 3 (not shown).

In connection with the embodiments described above, it is to be understood that the bearing balls 10 and 20 are regularly distributed in a radial plane and preferably guided by for example some type of ball cage, which is not shown for the sake of clearness.

Figure 4:
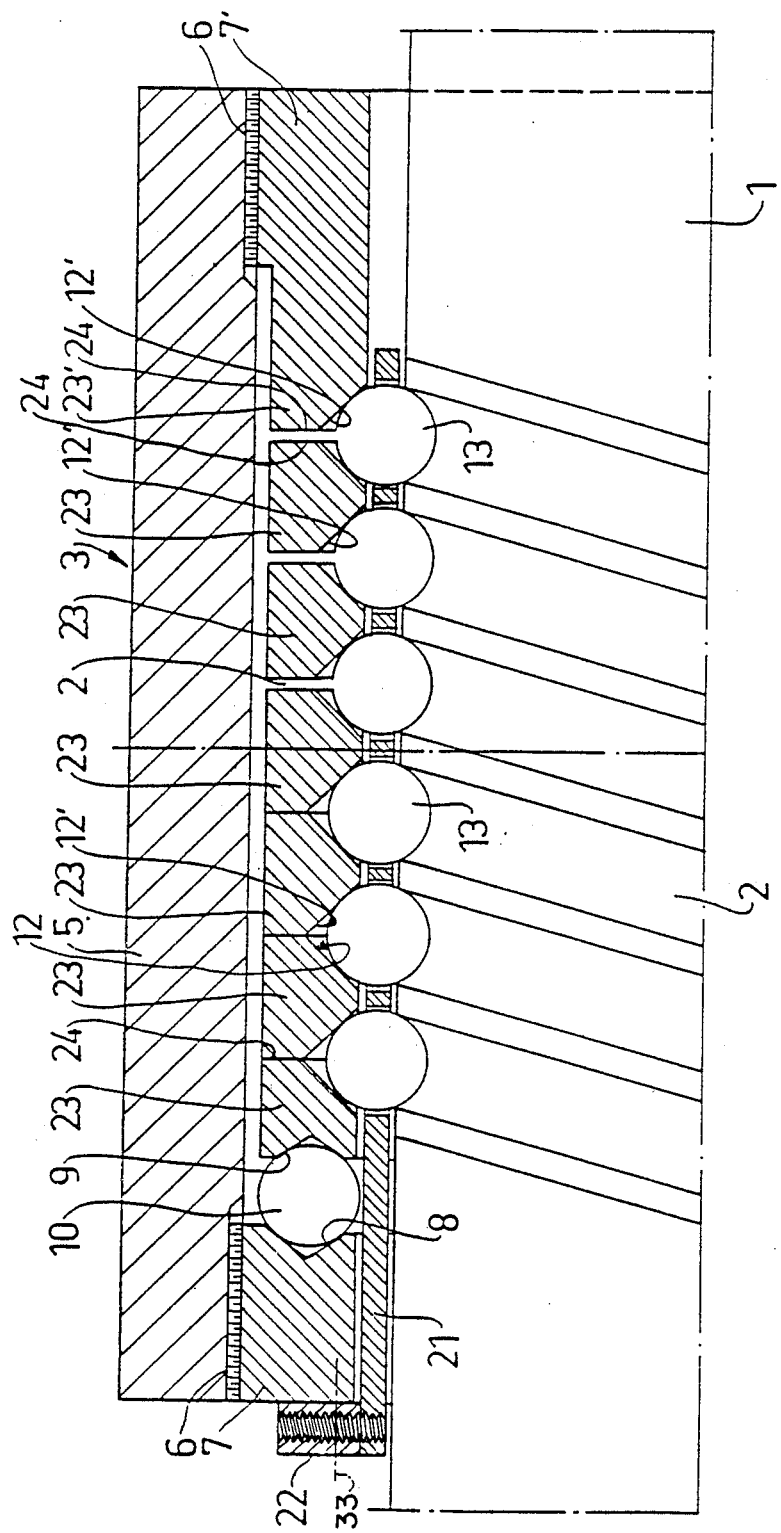
FIG. 4 shows a fourth embodiment of the invention.

As shown in FIG. 4, the raceway ring can be divided into more than two parts according to the invention, for example so that two adjacent parts 23 form together a groove 12 for the balls 13. The ball cage 21 is preferably be in one piece and, for instance, be fixed to the bearing ring 7 of the nut 3. In case the parts of the raceway ring are dimensioned so that they bear against each other with the end surfaces 24, as shown to the left in FIG. 4, the axial force deriving from the balls 13 in each radial plane will be transmitted via the part rings 23 to the nut sleeve 5.

It is shown to the right in FIG. 4, as an example, how the parts of the raceway ring are underdimensioned as to width. Consequently, there is a play 25 between the end surfaces 24 of adjacent parts 23. In this case, the axial force will be transmitted via balls and ring parts to the nut sleeve 5.

By this division of the raceway ring into several part rings 23 with the groove 12 formed by groove parts 12' in the end surfaces of the respective part, ring manufacture and mounting are substantially simplified. Accordingly, the ball screw of the invention can be manufactured and sold in the form of "building sets" for varying power need.

As is apparent from the right part of FIG. 4 it is possible by the arrangement of the groove part 12' in the end surface of at least the outermost part of the raceway ring to omit the bearing balls 10 and to provide the bearing ring 7' with a corresponding groove part 12'.

Figure 5:
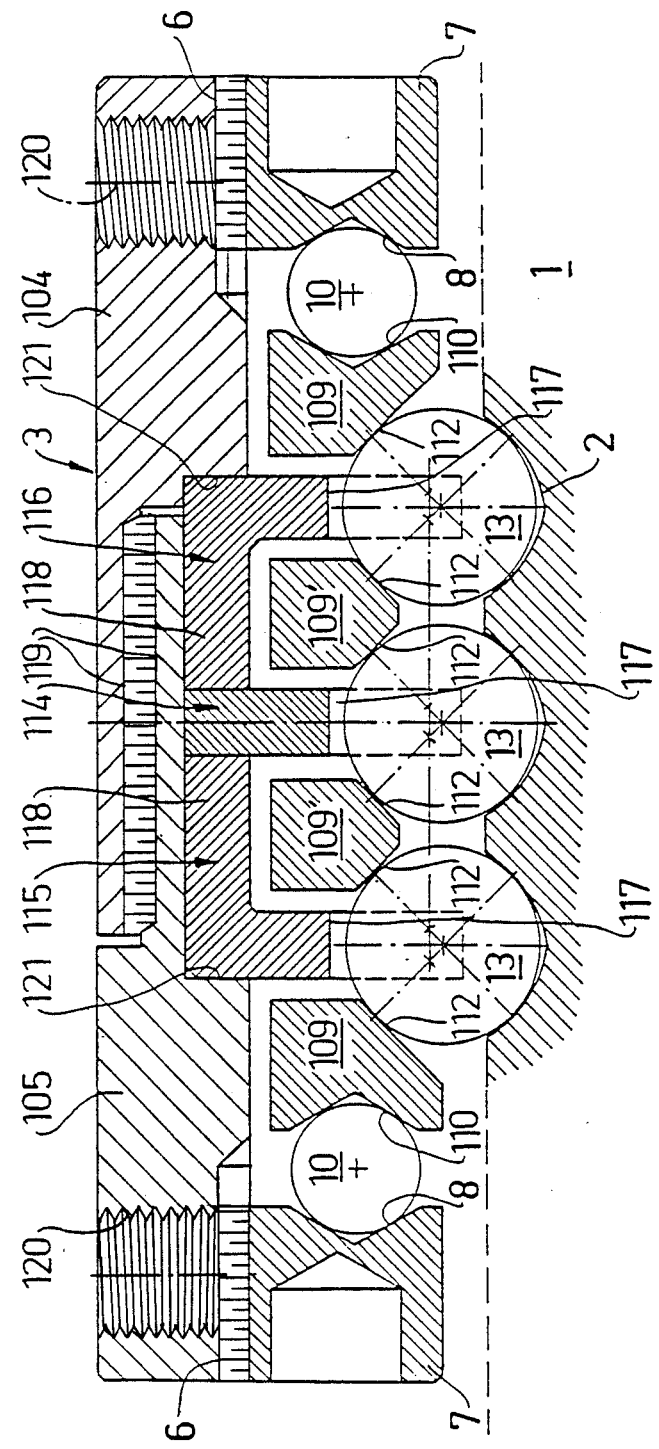
FIG. 5 shows schematically a fifth example of an embodiment of the ball screw.

In FIG. 5, the nut of the ball screw is generally designated by 3 and consists of a nut sleeve 104 and 105, respectively, formed in two parts, which sleeve is provided with interior threads 6 at its end parts. End rings or bearing rings 7 are provided on their outsides with corresponding threads and are threaded into the end parts of the nut sleeve 104, 105, as is apparent from FIG. 5. The inwardly facing end surface of the respective bearing ring 7 has a ball raceway 8. The nut 3 comprises further, in the example shown, four raceway rings 109, 109' separated from each other, the outermost ones 109 thereof also being provided with each their ball race 110 at their end surfaces. Between the ball races 8 and 110 bearing balls 10 are arranged so that the raceway rings 109 are freely rotatably mounted in the nut sleeve 104, 105.

Ball races 112 are formed in the sides of the raceway rings 109, 109' facing each other which form together in pairs, grooves extending perpendicularly to the axis of the screw 1. The balls 13 of the ball screw are received in these grooves. Furthermore, the ball screw has a ball cage consisting of three parts 114, 115, 116 separated from each other in the example shown, i.e. a separate ball cage for each row of balls. In order to achieve an exact and accurate axial movement of the nut in the operation of the device—rotation of the screw—the respective ball cage 114, 115, 116 is to prevent the balls 13 from rolling or being brought along in the ball races of the nut in the rotary motion of the screw, and therefore the ball cages are fixed to the nut 3 as will be described below.

Figure 6:
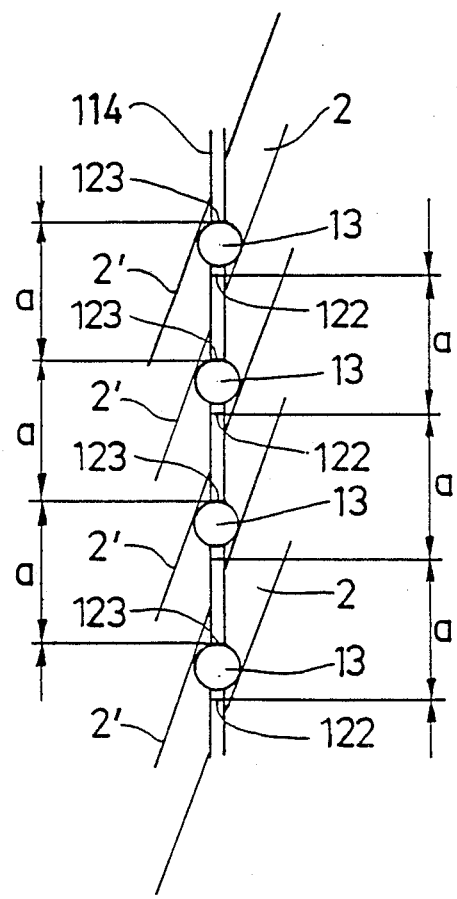
FIG. 6 shows schematically the threads of the screw spread out in a plane.

In principle, the ball cage 114 has the form of a ring, the inner side or edge of which is provided with recesses 117 corresponding to the number of the balls. It is easy to produce the ball cage and the recesses 117 can, for instance, be milled in the ring, the demand on tolerance being that the pitch a between edges 122 and/or 123 of the recesses 117 lying alike (see FIG. 6) is as great. The ball cages 115 and 116 which ccan be made like those designated by 114 are also formed in principle, by each one ring, the inside of which has a recess 117 corresponding to the number of the balls 13. At the outer edge of the ball cage 115 (like 116), an axially directed flange 118 is arranged with such a length that a raceway ring 109' can be freely received inside the flange 118 and between the adjacent ball cages 115-114-116. In the example shown, the free edges of the flanges 118 abut the intermediate ball cages 114. The same simple demand on tolerance applies to these ball cages 115 and 116 as to the ball cage 114.

It is to be understood, which is also apparent from FIG. 5, that the parts 104 and 105 of the nut sleeve can be axially screwed together by means of a male and female member, respectively, through threads 119 made in the male and female member, respectively. 120 designates schematically locking screws for the outer bearing rings 7.

By the embodiment of the nut as described, especially the ball cages 114, 115, 116, it is possible to bring all the balls 13 in a simple way in mounting to a uniform contact with the flanks of the screw thread. When mounting and after combining the nut 3 with ball rows and ball cage on place enclosing the screw 1 but before the parts 104, 105 of the nut sleeve have been tightened too each other, and while the screw cages 114, 115, 116 are turnable in the nut 3 the bearing rings 7 are set, the balls 13 being compelled radially inwards by the influence of the raceway rings 109, 109' down into the threads of the screw 1. Thus, the balls in each row do not move in axial direction but adapt themselves to the screw threads by moving in the peripheral direction, which is made possible thanks to the fact that the ball cages 114, 115 and 116, respectively, of the ball row are not prevented from moving in the nut. When a desired setting force against the screw via the bearing rings 7, the bearing balls 111 and the raceway rings 109, 109' has been achieved in the balls 13, for example to provide freedom of play between balls—screw thread, the parts 104, 105 of the nut sleeve are tightened, the ball cages 114, 115, 116 being automatically locked in entered positions by being clamped between the parts 104, 105 via a shoulder 121, as clearly shown in FIG. 5. By having the same pitch of the threads 6 and 119 and fixing the rings 7 in the space while the nut members 104, 105 are being tightened, the desired setting force can be maintained unchanged in tightening. The parts 104 and 105 of the nut sleeve can be locked to each other by the aid of suitable locking means, not shown.

Thus, in order to achieve a great precision of the device, it is required by the aid of the invention that only a great measuring accuracy of the screw is ensured in manufacture. In mounting, the other parts of the device will adapt themselves to the screw threads, as described above. All the balls of the nut will receive or transmit an equal force, force transmission between screw and nut taking place in an optimal way. This means that local overloads are avoided and that the device consequently can be dimensioned smaller in a corresponding degree than would have been the case if dimensioning of local uneven loads must be considered. It is possible by means of the nut of the invention to take up and eliminate errors of the screw pitch. The same nut can also be adapted with an optimal force transmission to screws having diameters not agreeing with each other due to a less accurate tolerance of diameter in manufacture.

Moreover, it is to be understood that more than three ball rows, of course, can be arranged with a corresponding greater number of ball cages (like raceway rings 109, 109'). The parts 104, 105 of the nut sleeve can be mounted and locked to each other in other manners than that shown.

I claim:

1. A ball screw, comprising:
   a longitudinally elongated screw having a radially outer peripheral surface provided with a helical groove;
   a nut coaxially surrounding said screw and including a raceway ring coaxially received in a nut sleeve; the raceway ring being freely rotatable relative to the nut sleeve about the longitudinal axis of the screw;
   means defining a series of parallel, radially inwardly opening inner circumferential grooves in said raceway ring, extending perpendicularly to the longitudinal axis of the screw;
   a series of balls having a radially inner portion received in said helical groove in said screw and a radially outer portion received in a said respective groove in said raceway ring;
   a ball cage having a plurality of openings provided radially therethrough; said ball cage being coaxially received radially between said raceway ring and said screw, so that a radially intermediate portion of each ball protrudes through a respective said opening; and
   means connecting the ball cage with the nut sleeve thereby fixing the ball cage with respect to the nut sleeve for preventing rotational translation of the balls with respect to the nut sleeve as the screw rotates about the longitudinal axis thereof.

2. The ball screw of claim 1, further including:
   two axially spaced bearing rings fixed to the nut sleeve so as to provide two axially spaced radially inwardly projecting shoulders axially spacedly confronting axially opposite ends of said raceway ring;
   means defining ball races in said shoulders and in said opposite ends of said raceway ring; and
   one set of bearing balls arranged in respective said ball races between one said shoulder and one said end of said raceway ring, and another set of bearing balls arranged in respective said ball races between the other said shoulder and the other said end of said raceway ring, for axially immobilizing said raceway ring with respect to said nut sleeve.

3. The ball screw of claim 1 wherein:
   said series of grooves in said raceway ring has a pitch equal to that of said helical groove on said screw.

4. The ball screw of claim 1, wherein:
   said series of grooves in said raceway ring has a pitch which is different from that of said helical groove on said screw.

5. The ball screw of claim 2, wherein:
   said ball races provided in said opposite ends of said raceway ring are each provided with a profile generated by a sector of a circle, the center of which is located on the longitudinal axis of the screw and in a plane perpendicular to said axis halfway between opposite ends of said raceway ring.

* * * * *